United States Patent
Yamajo et al.

(10) Patent No.: US 8,238,684 B2
(45) Date of Patent: Aug. 7, 2012

(54) SIGNAL PROCESSING APPARATUS AND METHOD, AND PROGRAM

(75) Inventors: Hiroaki Yamajo, Tokyo (JP); Koji Aoyama, Saitama (JP)

(73) Assignee: Sony Corporation, Tokyo (JP)

(*) Notice: Subject to any disclaimer, the term of this patent is extended or adjusted under 35 U.S.C. 154(b) by 849 days.

(21) Appl. No.: 12/369,448

(22) Filed: Feb. 11, 2009

(65) Prior Publication Data

US 2009/0220168 A1 Sep. 3, 2009

(30) Foreign Application Priority Data

Mar. 3, 2008 (JP) ................ P2008-052035

(51) Int. Cl.
*G06K 9/40* (2006.01)
(52) U.S. Cl. ........ 382/260; 382/274; 382/275; 382/284; 358/3.26; 358/3.27; 358/463
(58) Field of Classification Search ................ 382/260, 382/274, 275, 284; 358/3.26, 3.27, 463
See application file for complete search history.

(56) References Cited

U.S. PATENT DOCUMENTS

| | | | |
|---|---|---|---|
| 5,452,090 A * | 9/1995 | Progler et al. ............... 356/401 |
| 6,434,275 B1 | 8/2002 | Fukuda et al. | |
| 6,567,567 B1 * | 5/2003 | Levin et al. ................ 382/284 |
| 7,006,881 B1 * | 2/2006 | Hoffberg et al. ............. 700/83 |
| 7,128,270 B2 * | 10/2006 | Silverbrook et al. ..... 235/472.01 |
| 7,346,224 B2 | 3/2008 | Kong et al. | |
| 7,933,435 B2 * | 4/2011 | Hunter et al. ............ 382/128 |
| 2004/0012582 A1 | 1/2004 | Kim | |
| 2006/0171473 A1 | 8/2006 | Schoner | |

FOREIGN PATENT DOCUMENTS

| | | |
|---|---|---|
| EP | 0 762 738 A3 | 3/1997 |
| EP | 1 755 082 A3 | 2/2007 |
| EP | 2 047 801 A1 | 4/2009 |
| JP | 2004-336651 | 11/2004 |
| JP | 2005-318614 | 11/2005 |
| JP | 4164877 | 8/2008 |
| WO | WO 98/54892 | 12/1998 |
| WO | WO 2008/010375 A1 | 1/2008 |

OTHER PUBLICATIONS

A. Jacquin et al., "Content-Adaptive Postfiltering for Very Low Bit Rate Video," Data Compression Conference '97 Proceedings, IEEE Comput. Soc., pp. 111-120 (1997).

* cited by examiner

*Primary Examiner* — Yosef Kassa
(74) *Attorney, Agent, or Firm* — Finnegan, Henderson, Farabow, Garrett & Dunner, L.L.P.

(57) ABSTRACT

A signal processing apparatus for performing a filtering process on an input image using a plurality of filters to generate an output image includes the following elements. A region variance value calculating unit calculates a region variance value for a region around a predetermined pixel used as a pixel of interest on the input image. A filter processing unit applies a filtering process to a pixel value of the pixel of interest using the filters. A reflection amount determining unit determines a reflection amount based on the region variance value. A combining unit calculates a pixel value of a pixel of the output image corresponding to the pixel of interest on the basis of respective filter output values obtained by filtering processes applied by a plurality of filter processing units, respective reflection amounts determined with respect to the filter output values, and the pixel value of the pixel of interest.

7 Claims, 4 Drawing Sheets

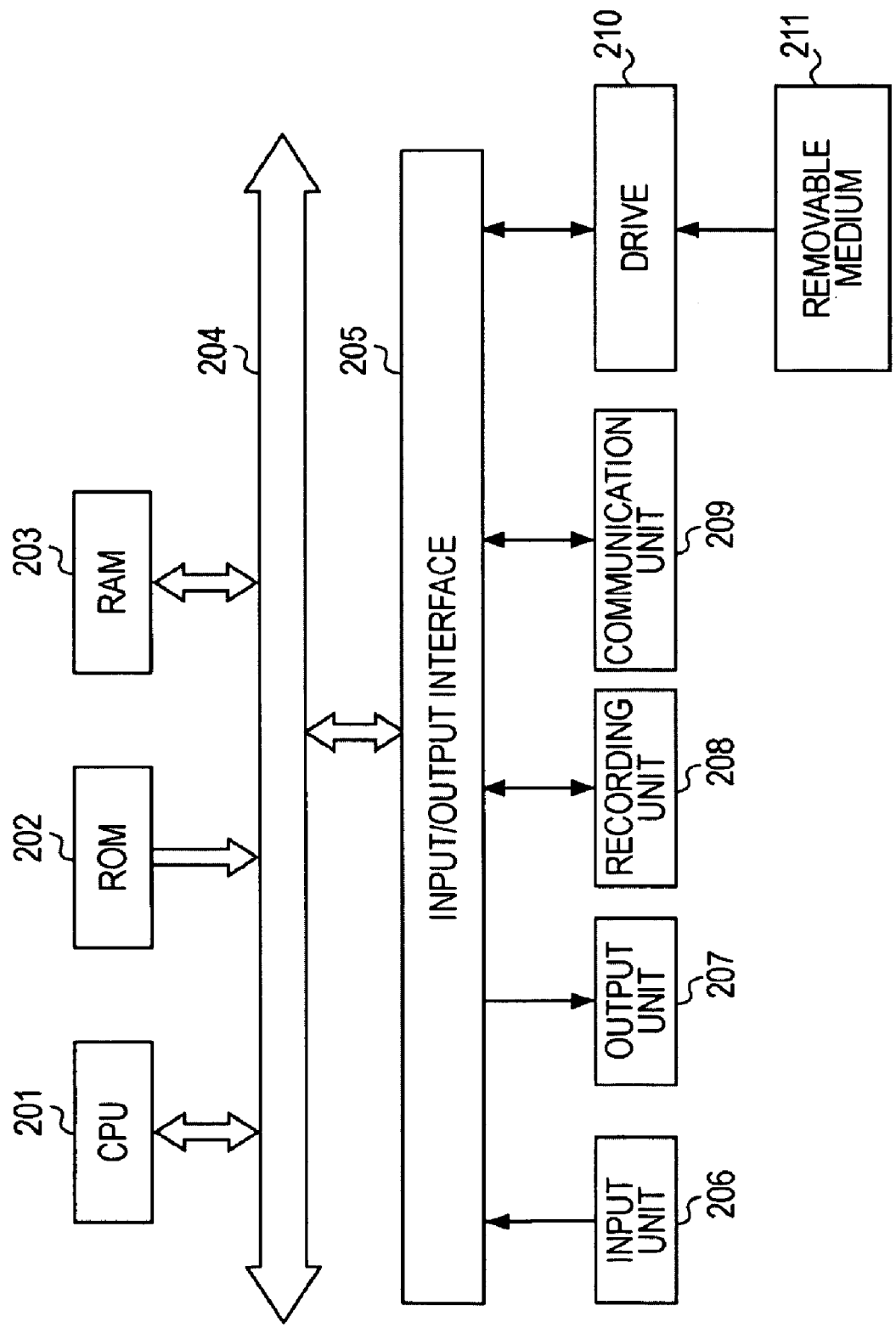

SIGNAL PROCESSING APPARATUS AND METHOD, AND PROGRAM

CROSS REFERENCES TO RELATED APPLICATIONS

The present invention contains subject matter related to Japanese Patent Application JP 2008-052035 filed in the Japanese Patent Office on Mar. 3, 2008, the entire contents of which are incorporated herein by reference.

BACKGROUND OF THE INVENTION

1. Field of the Invention

The present invention relates to a signal processing apparatus and method, and a program. More specifically, the present invention relates to a signal processing apparatus and method, and a program which provide easy and reliable noise reduction using a plurality of filters.

2. Description of the Related Art

Mosquito noise and block noise are examples of noise caused by image compression processes using Moving Picture Experts Group (MPEG) techniques.

Mosquito noise is noise which produces a pseudo outline along the outline of an object on an image. Block noise is produced in units of discrete cosine transform (DCT) blocks in compression processing. Block noise causes discontinuities at boundaries between DCT blocks.

Mosquito noise and block noise are believed to be caused by the lost of high-order image information, or high-frequency components, due to the quantization in DCT transform in image compression processing.

Algorithms for reducing such noise have been proposed. For example, a method for reducing mosquito noise is disclosed in, for example, Japanese Unexamined Patent Application Publication No. 2004-336651. In this method, an edge region in an image is detected and mosquito noise is removed from the detected edge region, while the sharpness of the image is maintained, using a non-linear smoothing filter.

A method for reducing block noise is disclosed in, for example, International Publication No. WO 98/54892, in which a parameter necessary for the determination of block distortion from input image data is calculated and block distortion is determined based on the calculated parameter and a detected parameter which indicates the level of difficulty in image coding. In this method, a result of the determination of block distortion is used to calculate a correction value for reducing the block distortion, and the input image data is corrected using the correction value.

However, one of a mosquito noise reduction technique and a block noise reduction technique would not reduce both mosquito noise and block noise. A simple combination of both techniques may cause a conflict between the effect of mosquito noise reduction and the effect of block noise reduction or may cause a result of one of the processes to adversely affect the accuracy of the other process.

Specifically, filtering processes applied to a given region using a plurality of filters may halve effects. Or, a filtering process applied to a region using a filter may prevent the region from being detected as a region to which a filtering process is to be applied using another filter.

Accordingly, methods for reducing noise using a combination of mosquito noise reduction and block noise reduction have been proposed (see, for example, Japanese Unexamined Patent Application Publication No. 2005-318614). In the method disclosed in Japanese Unexamined Patent Application Publication No. 2005-318614, an input image is divided into a plurality of blocks based on a variance image of the input image, and the obtained blocks are classified as being either smooth, texture, or edge blocks. The smooth blocks are filtered for block noise reduction, and the edge blocks are filtered using a fuzzy filter for mosquito noise reduction. Therefore, effective noise reduction of the input image is achieved.

SUMMARY OF THE INVENTION

In the methods for reducing noise using a combination of mosquito noise reduction and block noise reduction, however, it is also difficult to reliably reduce noise from an image because the mosquito noise reduction process and the block reduction process are switched for each block.

Specifically, in the mechanism in which the mosquito noise reduction process and the block noise reduction process are switched for each block, even though both mosquito noise and block noise occur in the same block or in several adjacent blocks, one of the noise reduction processes is active while the other noise reduction process is not active.

Furthermore, since the blocks are classified according to a threshold value, several adjacent blocks whose values used for the determination of classification are close to the threshold value may cause discontinuities at the boundaries between blocks because a different filtering process is applied to each of the blocks. Moreover, when noise is to be removed from a moving image, a block in the same portion of the image may be subjected to different filtering processes depending on the time (or frame), which may impair stability over time of the processes.

It is therefore desirable to more easily and reliably reduce noise using a plurality of filters.

An embodiment of the present embodiment provides a signal processing apparatus for performing a filtering process on an input image using a plurality of filters to generate an output image. The signal processing apparatus includes the following elements. Region variance value calculating means calculates a region variance value for a region around a predetermined pixel used as a pixel of interest on the input image, the region variance value indicating a degree of variations of pixel values of pixels located in the region with respect to an average of pixel values of the pixels located in the region. Filter processing means applies a filtering process to a pixel value of the pixel of interest using the filters. Reflection amount determining means determines a reflection amount based on the region variance value, the reflection amount indicating a degree to which a filter output value obtained by the filtering process applied by the filter processing means contributes to generation of a pixel value of a pixel of the output image corresponding to the pixel of interest. Combining means calculates the pixel value of the pixel of the output image corresponding to the pixel of interest, the calculation being based on each of filter output values obtained by filtering processes applied by a plurality of filter processing means, each of reflection amounts determined with respect to the filter output values, and the pixel value of the pixel of interest.

The combining means can calculate the pixel value of the pixel of the output image by multiplying differences between the pixel value of the pixel of interest and the filter output values by the reflection amounts to determine difference values and adding a sum of the difference values to the pixel value of the pixel of interest.

The reflection amount determining means can determine the reflection amount of the filter output value from the region variance value calculated by the region variance value calculating means using information indicating a value of a reflection amount with respect to a magnitude of a region variance value, the information being determined in advance for each of the filters used in the filtering process.

First filter processing means in the plurality of filter processing means can be configured to perform the filtering process using a filter that performs a moving average process, and second filter processing means in the plurality of filter processing means can be configured to perform the filtering process using a filter that performs a smoothing process.

Another embodiment of the present invention provides a signal processing method or program for performing a filtering process on an input image using a plurality of filters to generate an output image. The signal processing method or program includes the steps of calculating a region variance value for a region around a predetermined pixel used as a pixel of interest on the input image, the region variance value indicating a degree of variations of pixel values of pixels located in the region with respect to an average of pixel values of the pixels located in the region; applying, at filter processing means, a filtering process to a pixel value of the pixel of interest using the filters; determining a reflection amount based on the region variance value, the reflection amount indicating a degree to which a filter output value obtained by the filtering process applied by the filter processing means contributes to generation of a pixel value of a pixel of the output image corresponding to the pixel of interest; and calculating the pixel value of the pixel of the output image corresponding to the pixel of interest, the calculation being based on each of filter output values obtained by filtering processes applied by a plurality of filter processing means, each of reflection amounts determined with respect to the filter output values, and the pixel value of the pixel of interest.

According to an embodiment of the present invention, a region variance value for a region around a predetermined pixel used as a pixel of interest on the input image is calculated, the region variance value indicating a degree of variations of pixel values of pixels located in the region with respect to an average of pixel values of the pixels located in the region; a filtering process is applied to a pixel value of the pixel of interest using the filters; a reflection amount is determined based on the region variance value, the reflection amount indicating a degree to which a filter output value obtained by the filtering process contributes to generation of a pixel value of a pixel of the output image corresponding to the pixel of interest; and the pixel value of the pixel of the output image corresponding to the pixel of interest is calculated based on each of filter output values obtained by a plurality of filtering processes, each of reflection amounts determined with respect to the filter output values, and the pixel value of the pixel of interest.

According to the embodiment of the present invention, therefore, noise can be more easily and reliably reduced using a plurality of filters.

BRIEF DESCRIPTION OF THE DRAWINGS

FIG. 5 is a block diagram showing an example structure of a computer.

DESCRIPTION OF THE PREFERRED EMBODIMENTS

An embodiment of the present invention will be described hereinafter with reference to the drawings.

Figure 1:
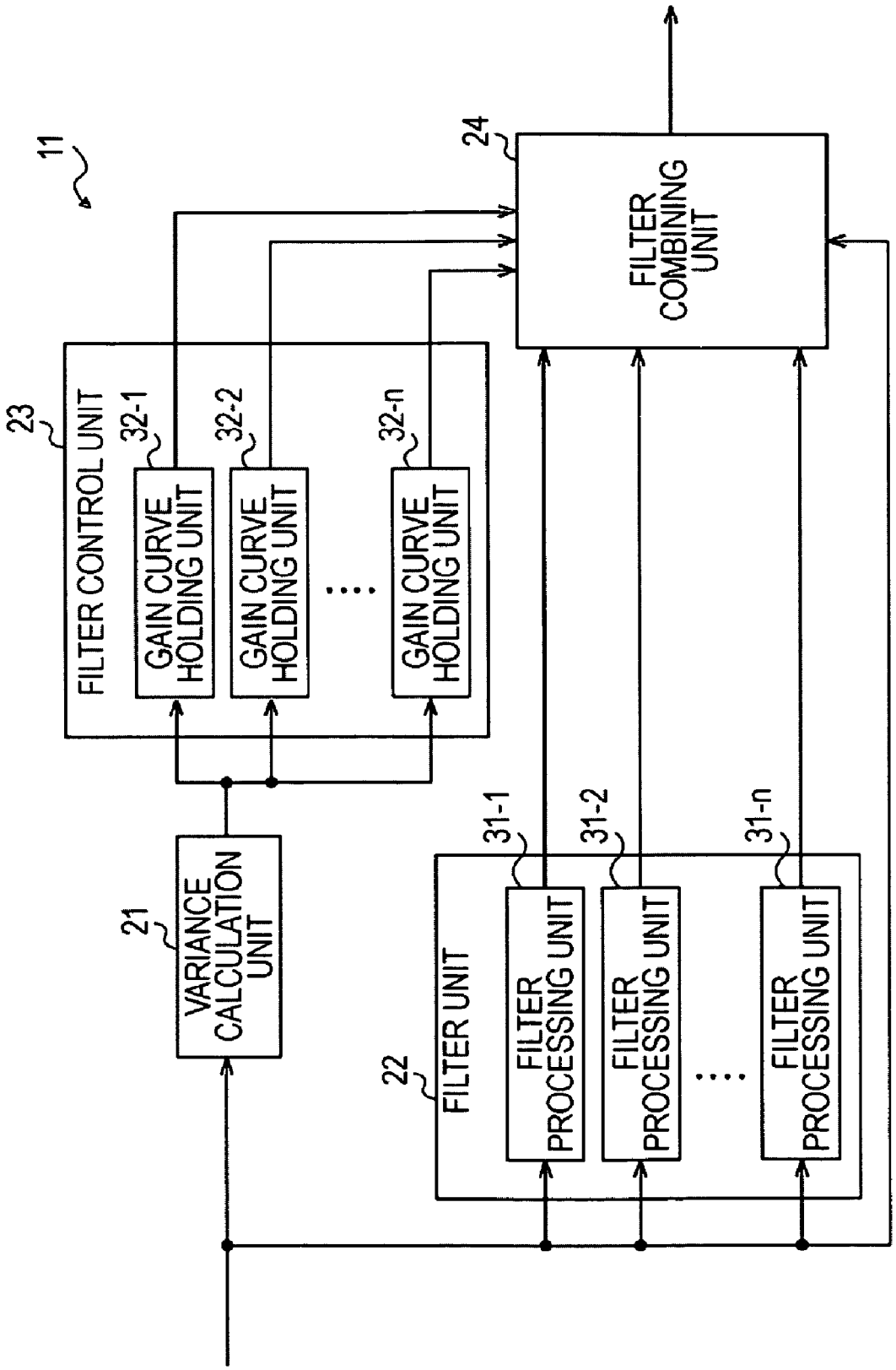
FIG. 1 is a block diagram showing an example structure of a signal processing apparatus according to an embodiment of the present invention.

FIG. 1 is a block diagram showing an example structure of a signal processing apparatus 11 according to an embodiment of the present invention.

The signal processing apparatus 11 includes a variance calculation unit 21, a filter unit 22, a filter control unit 23, and a filter combining unit 24.

An input image signal of an input image to which a noise reduction process is to be applied is input to the signal processing apparatus 11. The input image signal is supplied to the variance calculation unit 21, the filter unit 22, and the filter combining unit 24. The input image signal may be, for example, an image signal obtained by applying an expansion (or decoding) process to moving-image data compressed (or encoded) using an MPEG technique or the like.

The variance calculation unit 21 generates a subregion variance signal based on the supplied input image signal, and supplies the subregion variance signal to the filter control unit 23. The subregion variance signal indicates a variance of pixel values of pixels on the input image. For example, a specific pixel on the input image is designated as a pixel of interest, and a region around the pixel of interest is designated as a subregion. Then, a subregion variance value which indicates the degree of variations of pixel values of pixels in the subregion with respect to the average of the pixel values of the pixels is designated as a signal value of the subregion variance signal.

The filter unit 22 applies a filtering process to the supplied input image signal. Specifically, the filter unit 22 includes filter processing units 31-1 to 31-$n$, and the filter processing units 31-1 to 31-$n$ individually have finite impulse response (FIR) filters. The FIR filters may be implemented by, for example, moving average filters, smoothing filters, epsilon (E) filters, block noise reduction filters, or the like, which are determined in advance depending on the use.

Each of the filter processing units 31-1 to 31-$n$ applies a filtering process to the supplied input image signal using the corresponding FIR filter, and supplies a filter output signal obtained by the filtering process to the filter combining unit 24. The filter processing units 31-1 to 31-$n$ are hereinafter referred to simply as "filter processing units 31" unless otherwise noted individually.

The filter control unit 23 determines a reflection amount based on the subregion variance signal supplied from the variance calculation unit 21. The reflection amount represents the ratio of contribution of each of the FIR filters provided in the filter processing units 31-1 to 31-$n$ to noise removal from the input image signal.

Specifically, the filter control unit 23 includes gain curve holding units 32-1 to 32-$n$, and each of the gain curve holding units 32-1 to 32-$n$ holds a gain curve for one of the FIR filters of the filter processing units 31-1 to 31-$n$. The gain curve may be a curve which is determined in advance according to the characteristics of the corresponding FIR filter and which represents the relationship between the gain of the FIR filter, that is, the reflection amount, and the subregion variance value. More specifically, each of the gain curve holding units 32-1 to 32-$n$ includes a function, table, or the like which indicates a gain curve.

Each of the gain curve holding units 32-1 to 32-*n* determines a reflection amount which represents the contribution ratio of the corresponding FIR filter, that is, the weight of the FIR filter, based on the subregion variance signal supplied from the variance calculation unit 21 and the held gain curve. The reflection amount may take a value of, for example, 0 to 1.

The gain curve holding units 32-1 to 32-*n* supply the determined reflection amounts to the filter combining unit 24. The gain curve holding units 32-1 to 32-*n* are hereinafter referred to simply as "gain curve holding units 32" unless otherwise noted individually.

The filter combining unit 24 performs a process of removing noise from the supplied input image signal. Specifically, the filter combining unit 24 generates an output image signal, which corresponds to the input image signal from which noise has been removed, based on the supplied input image signal, the filter output signals from the filter processing units 31, and the reflection amounts from the gain curve holding units 32, and outputs the output image signal.

Next, a noise reduction process in which the signal processing apparatus 11 removes noise from the input image signal and outputs a resulting output image signal will be described with reference to a flowchart shown in FIG. 2.

In step S11, the variance calculation unit 21 designates one of pixels on the input image as a pixel of interest on the basis of the supplied input image signal, and determines a subregion variance value of the pixel of interest.

For example, it is assumed that a subregion of the input image, which is centered on the pixel of interest, is a region having M rows of pixels and N columns of pixels (M pixels by N pixels) and that an average value of the pixel values of the pixels in the subregion is denoted by Ave. It is further assumed that the pixel of interest is a pixel located in the i-th row and the j-th column with respect to a reference point on the input image and that a signal value of an input image signal which indicates the pixel value of the pixel located in the (i+m)-th row and the (j+n)-th column with respect to the reference point is denoted by X(i+m, j+n). In this case, the variance calculation unit 21 calculates Equation (1) below to determine a subregion variance value Var(i, j) of the pixel of interest:

$$\mathrm{Var}(i, j) = \frac{1}{M \cdot N} \sum_{m=-(M-1)/2}^{(M-1)/2} \sum_{n=-(N-1)/2}^{(N-1)/2} (X(i+m, j+n) - Ave)^2 \quad (1)$$

Specifically, the subregion variance value Var(i, j) of the pixel of interest is obtained by determining the squares of the differences between the pixel values of the pixels in the subregion and the average value Ave and dividing the sum of the determined squares of the differences for the respective pixels by the number of pixels (i.e., M×N) in the subregion.

Note that, in order to reduce the calculation cost, the variance calculation unit 21 may calculate Equation (2) below to determine a quasi-variance and the calculated variance may be used as the subregion variance value Var(i, j) of the pixel of interest:

$$\mathrm{Var}(i, j) = \frac{1}{M \cdot N} \sum_{m=-(M-1)/2}^{(M-1)/2} \sum_{n=-(N-1)/2}^{(N-1)/2} |X(i+m, j+n) - Ave| \quad (2)$$

The subregion variance value given by Equation (2) is obtained by determining the absolute values of the differences between the pixel values of the pixels in the subregion and the average value Ave and dividing the sum of the determined absolute values of the differences for the respective pixels by the number of pixels in the subregion.

The variance value of the pixel of interest, which is determined in the manner described above, that is, a subregion variance signal which indicates the subregion variance value, is supplied from the variance calculation unit 21 to the gain curve holding units 32.

In step S12, each of the gain curve holding units 32-1 to 32-*n* determines a reflection amount for the corresponding one of the FIR filters on the basis of the subregion variance value supplied from the variance calculation unit 21 and the held gain curve.

Figure 3A:
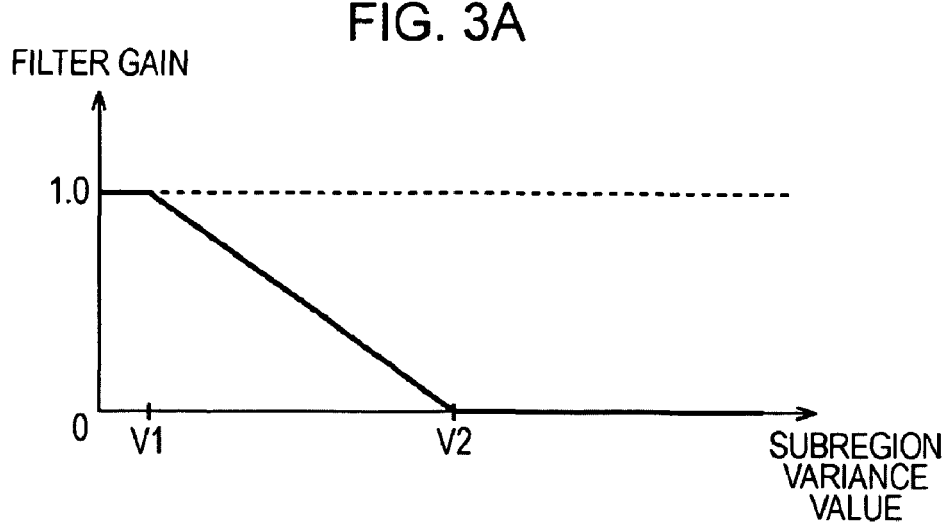
FIGS. 3A and 3B are diagrams showing exemplary gain curves.
Figure 3B:
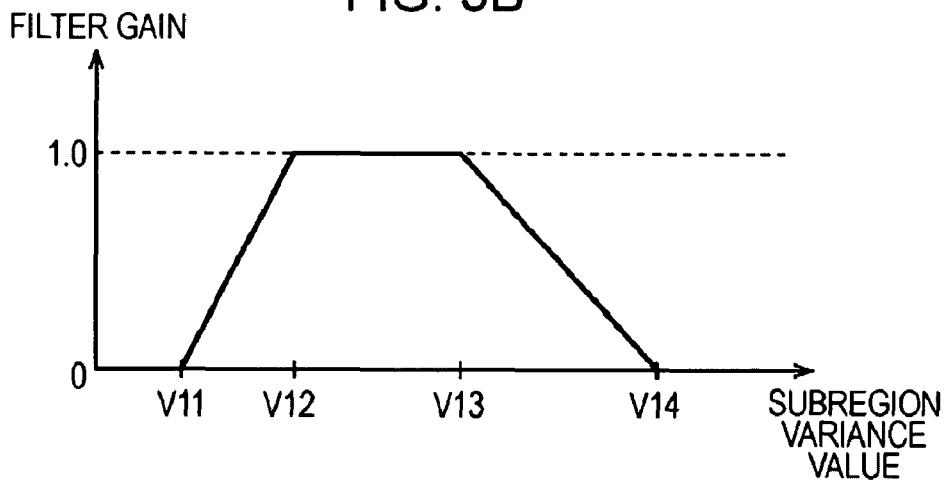

For example, the gain curve holding units 32 hold a gain curve shown in FIG. 3A or 3B. In FIGS. 3A and 3B, the ordinate axis represents a gain of an FIR filter, that is, a reflection amount, and the abscissa axis represents a subregion variance value.

In the gain curve shown in FIG. 3A, when the subregion variance value ranges from 0 to V1, the reflection amount is set to 1. When the subregion variance value ranges from V1 to V2, the reflection amount decreases as the subregion variance value increases. When the subregion variance value is V2 or more, the reflection amount is set to 0.

In the gain curve shown in FIG. 3A, therefore, the smaller the subregion variance value, the greater the contribution of the corresponding FIR filter to the generation of an output image signal. When the subregion variance value is V2 or more, the corresponding FIR filter is not used to generate an output image signal.

For example, the gain curve holding units 32 hold the gain curve shown in FIG. 3A. In this case, when a subregion variance value equal to the value V1 is supplied from the variance calculation unit 21, the gain curve holding units 32 supply a reflection amount of 1 to the filter combining unit 24 based on the gain curve.

In the gain curve shown in FIG. 3B, when the subregion variance value ranges from 0 to V11, the reflection amount is set to 0. When the subregion variance value ranges from V11 to V12, the reflection amount increases as the subregion variance value increases. When the subregion variance value ranges from V12 to V13, the reflection amount is set to 1. When the subregion variance value ranges from V13 to V14, the reflection amount decreases as the subregion variance value increases. When the subregion variance value is V14 or more, the reflection amount is set to 0. In the gain curve shown in FIG. 3B, when the subregion variance value is within a predetermined range, the contribution of the corresponding FIR filter to the generation of an output image signal is large.

Here, consideration will be given to removal of block noise and mosquito noise from an input image signal.

Block noise is likely to occur in a smooth portion of the image, which may be a region with small brightness change. In general, block noise is removed using a filter which refers to a wide range of pixels (or a wide pixel region), that is, a filter which uses a relatively wide region of pixels to perform processing. Therefore, for example, a seven-tap moving average filter is suitable to remove block noise.

Mosquito noise, on the other hand, is likely to occur in a portion with large amplitude on the image, which may be a region with large change in brightness values, such as an edge. A filter which cuts a small-amplitude high-frequency component is suitable to remove mosquito noise. That is, a filter which smoothes a region whose brightness value changes a small amount but rapidly changes is suitable, such as a five-tap ε filter which performs smoothing only using pixels whose difference from the center pixel (or the pixel of interest) is within a threshold value.

Accordingly, in order to simultaneously remove block noise and mosquito noise from the input image signal, the n FIR filters held in the filter processing units 31 include at least a moving average filter and an ε filter.

Figure 4:
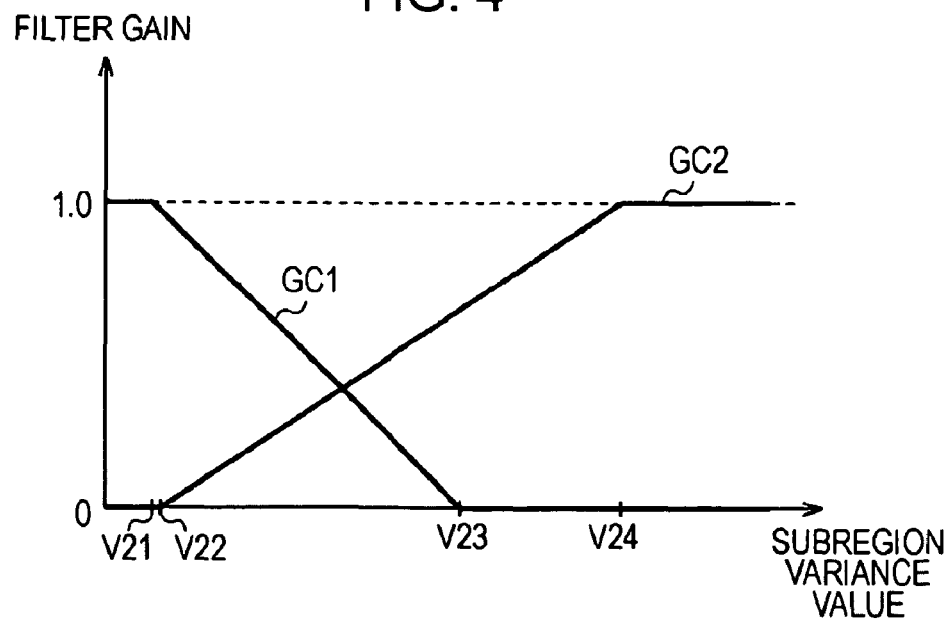
FIG. 4 is a diagram showing exemplary gain curves.

In this case, the moving average filter and the ε filter have gain curves shown in, for example, FIG. 4. In FIG. 4, the ordinate axis represents a gain of an FIR filter, that is, a reflection amount, and the abscissa axis represents a subregion variance value. The moving average filter has a gain curve GC1 and the ε filter has a gain curve GC2.

In the gain curve GC1 of the moving average filter, when the subregion variance value ranges from 0 to V21, the reflection amount is set to 1. When the subregion variance value ranges from V21 to V23, the reflection amount decreases as the subregion variance value increases. When the subregion variance value is V23 or more, the reflection amount is set to 0.

In the gain curve GC1, therefore, the smaller the subregion variance value, the greater the contribution of the corresponding moving average filter to the generation of an output image signal, more specifically, the greater the contribution of the filter output signal obtained by performing filtering using the moving average filter to the generation of an output image signal. When the subregion variance value is V23 or more, the moving average filter is not used to generate an output image signal.

In a smooth region with small brightness change in an input image, where block noise may be likely to occur, therefore, the moving average filter, which is suitable to remove block noise, greatly contributes to the generation of an output image signal. This allows the block noise to be properly removed from the input image. In a region having a large subregion variance value, where block noise may be less likely to occur, such as an edge or texture of an input image, the moving average filter is not used to generate an output image signal. Blurring of a significant component of the input image can be prevented.

In the gain curve GC2 of the ε filter, when the subregion variance value ranges from 0 to V22, the reflection amount is set to 0. When the subregion variance value ranges from V22 to V24, the reflection amount increases as the subregion variance value increases. When the subregion variance value is V24 or more, the reflection amount is set to 1.

In the gain curve GC2, therefore, the larger the subregion variance value, the greater the contribution of the corresponding ε filter to the generation of an output image signal, more specifically, the greater the contribution of the filter output signal obtained by performing filtering using the ε filter to the generation of an output image signal. When the subregion variance value is V22 or less, the ε filter is not used to generate an output image signal.

In an edge or texture region of an input image having a large subregion variance value, where mosquito noise may be likely to occur, therefore, the ε filter, which is suitable to remove mosquito noise, greatly contributes to the generation of an output image signal. This allows the mosquito noise to be properly removed from the input image. In a smooth region with small brightness change in the input image, where mosquito noise may be less likely to occur, the ε filter is not used to generate an output image signal. Blurring of a significant component of the input image can be prevented.

In this manner, the contribution of each FIR filter to the generation of an output image signal is controlled based on a subregion variance value of each pixel in the input image, that is, based on local variance. Therefore, both block noise and mosquito noise on the input image can be effectively reduced.

Note that block noise and mosquito noise from an input image may be removed using three FIR filters. In this case, the FIR filters held in the filter processing units 31 may include, for example, a moving average filter, an ε filter, and a median filter.

The median filter is a filter for removing, from an input image, noise which may be difficult to be removed from the input image using an E filter or a moving average filter, that is, noise caused by sources other than an MPEG compression process. The median filter is designed so that a gain curve exhibits a reflection amount of about an intermediate value, such as about 0.5, when the subregion variance value is small.

In this manner, pixel values of pixels of an output image are generated using a combination of a moving average filter, an ε filter, and a median filter. This can address more various distortion images. In other words, a greater amount of noise can be removed from an input image.

Figure 2:
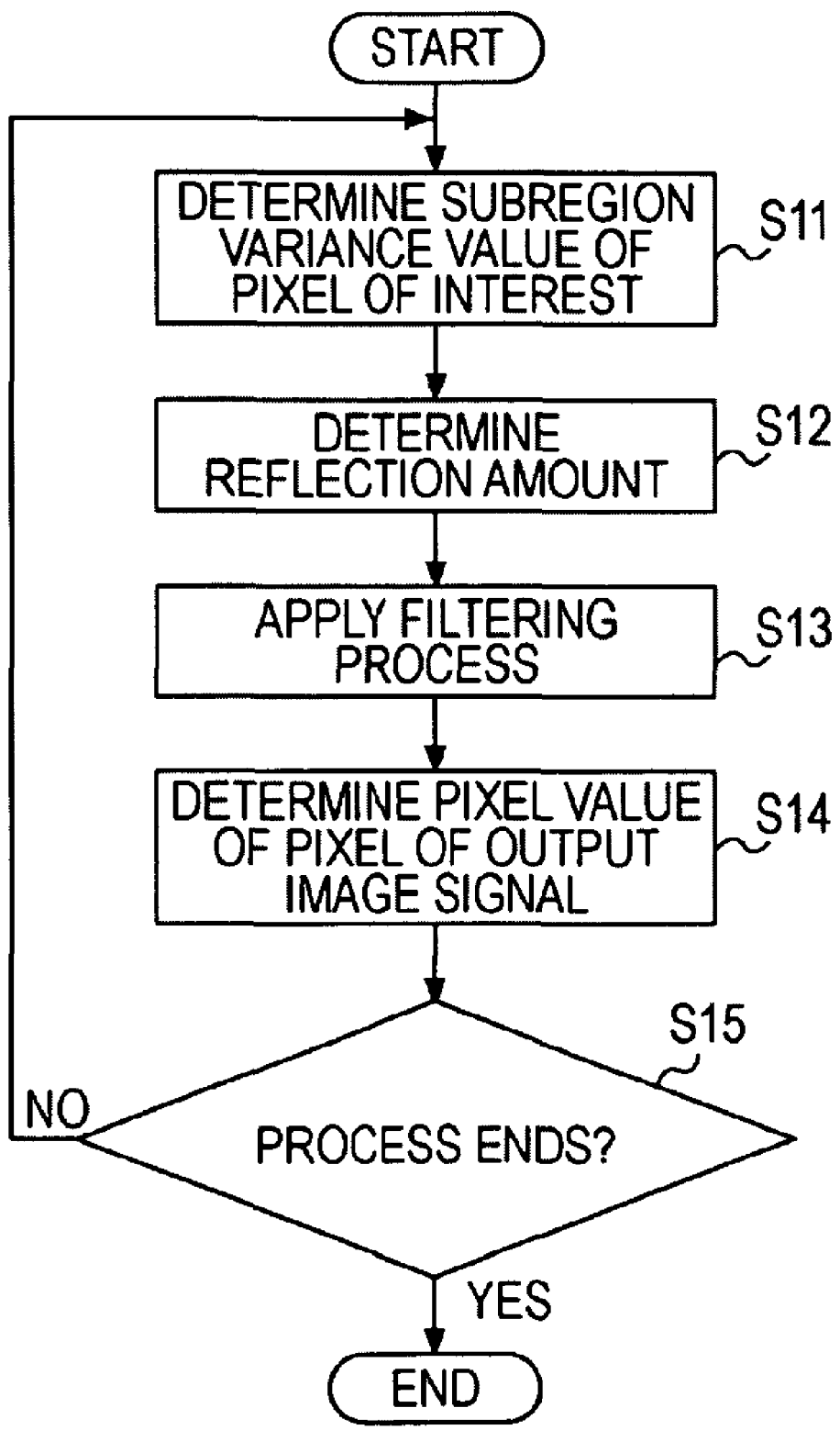
FIG. 2 is a flowchart describing a noise reduction process.

Referring back to the flowchart of FIG. 2, the gain curve holding units 32 determine reflection amounts of the FIR filters based on the subregion variance value and the gain curves, and supplies the reflection amounts to the filter combining unit 24.

In step S13, each of the filter processing units 31-1 to 31-n applies a filtering process to the supplied input image signal, more specifically, to the pixel value of the pixel of interest, using the held FIR filter. Then, each of the filter processing units 31-1 to 31-n supplies the signal value of the filter output signal obtained by the filtering process, that is, the pixel value of the pixel of interest to which the filtering process has been applied, to the filter combining unit 24.

In step S14, the filter combining unit 24 determines a pixel value of a pixel of an output image signal on the basis of the supplied pixel value of the pixel of interest, the reflection amounts from the gain curve holding units 32, and the pixel values (filter output signals) from the filter processing units 31. Specifically, a pixel value of a pixel located at the same position as that of the pixel of interest in the output image obtained by removing noise from the input image is determined, and a signal value which indicates the pixel value is output as an output image signal.

For example, it is assumed that the pixel value of the pixel of interest is denoted by "in" and that a pixel value output from a filter processing unit 31-i (where 1≤i≤n), that is, a value of a filter output signal, is denoted by $f_i$. It is further assumed that the reflection amount with respect to the value $f_i$ of the filter output signal is denoted by $bl_i$. Then, the filter combining unit 24 calculates Equation (3) below to determine a pixel value Out of a pixel of the output image signal:

$$Out = in + \sum_{i=1}^{n} (f_i - in) \cdot bl_i \quad (3)$$

The pixel value Out given by Equation (3) is obtained by multiplying the differences between the values $f_i$ of the respective filter output signals and the pixel value "in" of the pixel of interest by the reflection amounts $bl_i$ corresponding to the values $f_i$ of the filter output signals, then determining the sum of the products between the reflection amounts and the differences, which are determined for the respective filter output signals, and adding the pixel value "in" to the sum.

The value of a reflection amount for each gain curve may be determined so that the sum of reflection amounts with respect to respective subregion variance values in n gain curves, that is, the sum of n reflection amounts, is equal to 1 or is less than 1 or more than 1. In either case, the difference between the value of each filter output signal and the pixel value of the pixel of interest is multiplied by a reflection amount which indicates the degree of contribution of each filter, that is, each filter output signal, to the generation of an output image. Therefore, effective noise removal can be achieved.

Specifically, for example, if the difference between the value of each filter output signal and the pixel value of the pixel of interest is simply added to the pixel value of the pixel of interest, the sum of the differences becomes large to make the pixel value of the pixel of interest excessively noticeable. In this case, conversely, the effects of the respective filters may be canceled each other. In the signal processing apparatus 11, in contrast, a reflection amount of each filter is determined for each pixel of interest in accordance with features of a region around the pixel of interest, and a correction value corresponding to the reflection amount for each filter output signal, that is, a value obtained by multiplying the difference between the value of the filter output signal and the pixel value of the pixel of interest by the reflection amount, is added to the pixel value of the pixel of interest. This can provide effective noise removal from the input image without cancellation of the effects by the respective filters.

In step S15, the signal processing apparatus 11 determines whether or not the process ends. For example, if, for all frames of the supplied input image signals, a pixel of the input image is designated as a pixel of interest and noise has been removed from the input images of the respective frames, it is determined that the process ends.

If it is determined in step S15 that the process does not end, the process returns to step S11, and the processing described above is repeated. In the processing, for example, a pixel on the input image which has not yet been designated as a pixel of interest is designated as a new pixel of interest, or a pixel on an input image for a subsequent frame is designated as a pixel of interest. That is, pixels on input images for the respective frames are sequentially designated as pixels of interest, and a pixel value of a pixel of an output image is determined.

If it is determined in step S15 that the process ends, on the other hand, each unit in the signal processing apparatus 11 terminates the on-going process, and the noise reduction process ends.

In this manner, the signal processing apparatus 11 determines a subregion variance value from an input image signal for each pixel on an input image, and determines a reflection amount for each FIR filter based on the subregion variance value. The signal processing apparatus 11 generates, based on the reflection amounts, an output image signal from which noise has been removed from the filter output signal and the input image signal.

Accordingly, a reflection amount is determined based on a locally determined subregion variance value, and the degree of contribution of each FIR filter to noise removal is changed in accordance with the reflection amount to generate an output image signal. This allows noise to be removed using a combination of more suitable filters for each pixel of the input image without impairing significant components in the image. Therefore, noise can be more easily and reliably reduced. For example, both block noise and mosquito noise can be easily and reliably removed from an input image.

Additionally, in the signal processing apparatus 11, a subregion variance value is determined and a reflection amount of each FIR filter is determined based on the subregion variance value. This allows effective reduction of distortion in an input image, which may be caused by a compression process, at low calculation cost using information obtained beforehand in the compression process of the input image, that is, without using various parameters used in the compression process or expansion process.

For example, even when an input image is expanded using a reproducing device to enlarge the input image, a device for displaying the input image, which is located after the reproducing device, can perform a noise reduction process to prevent a degradation in image quality due to the distortion or noise caused in the expansion process or enlargement process.

In the signal processing apparatus 11, furthermore, noise is removed using a combination of FIR filters in accordance with the reflection amounts of the FIR filters. In other words, an FIR filter which is more effective for a region to be processed is weighted more heavily to perform processing.

This can prevent a plurality of filters from canceling the effects each other or can prevent an unintentional artifact from occurring due to the use of the plurality of filters. Further, inconveniences which may be caused by a mechanism of the related art in which two filters are switched so that one of the filters is selectively used, such unstable filtering processes over time for an input image or unnaturally noticeable DCT block boundaries on the input image, can be prevented.

Furthermore, in a portable video reproducing devices or the like which is configured to reproduce an input image, for example, when a low-definition MPEG image is input as an input image, sufficient calculation cost may not often be prepared for the desired noise reduction performance. Even in this case, because it is not necessary to divide the input image into blocks or to classify the blocks, the signal processing apparatus 11 can improve compression distortion of the MPEG image using a low-cost calculation process while maintaining the sharpness. In other words, the signal processing apparatus 11 can ensure low-calculation-cost high-performance noise reduction.

The series of processes described above may be executed by hardware or software. When the series of processes is executed by software, a program constituting the software is installed from a program recording medium into a computer incorporated in dedicated hardware or a device capable of executing various functions by installing various programs therein, such as a general-purpose computer.

FIG. 5 is a block diagram showing an example hardware configuration of a computer that executes the series of processes described above according to a program.

In the computer, a central processing unit (CPU) 201, a read only memory (ROM) 202, and a random access memory (RAM) 203 are connected to each other via a bus 204.

An input/output interface 205 is also connected to the bus 204. The input/output interface 205 is connected to an input unit 206 including a keyboard, a mouse, and a microphone, an output unit 207 including a display and speakers, a recording unit 208 including a hard disk and a non-volatile memory, a communication unit 209 including a network interface, and a drive 210 for driving a removable medium 211 such as a magnetic disc, an optical disc, a magneto-optical disc, or a semiconductor memory.

In the computer having the configuration described above, for example, the CPU 201 loads a program recorded on the recording unit 208 onto the RAM 203 via the input/output interface 205 and the bus 204 and executes the program, thereby performing the series of processes described above.

The program executed by the computer (namely, the CPU 201) may be recorded on the removable medium 211 that is a packaged medium formed of, for example, a magnetic disc (including a flexible disc), an optical disc (such as a compact disc-read only memory (CD-ROM) or a digital versatile disc (DVD)), a magneto-optical disc, or a semiconductor memory, or may be provided via a wired or wireless transmission medium such as a local area network, the Internet, or digital satellite broadcasting.

The program can be installed onto the recording unit 208 via the input/output interface 205 by placing the removable medium 211 in the drive 210. Alternatively, the program can be received at the communication unit 209 via a wired or wireless transmission medium and can be installed onto the recording unit 208. The program can also be installed in advance in the ROM 202 or the recording unit 208.

The program executed by the computer may be a program configured such that the processes are performed in a time sequence according to the order described herein, or may be a program configured such that the processes are performed in parallel or at a desired time such as when the program is invoked.

Embodiments of the present invention are not limited to the foregoing embodiment, and a variety of modifications can be made without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus for performing a filtering process on an input image using a plurality of filters to generate an output image, the signal processing apparatus comprising:
    region variance value calculating means for calculating a region variance value for a region around a predetermined pixel used as a pixel of interest on the input image, the region variance value indicating a degree of variations of pixel values of pixels located in the region with respect to an average of pixel values of the pixels located in the region;
    filter processing means for applying a filtering process to a pixel value of the pixel of interest using the filters;
    reflection amount determining means for determining a reflection amount based on the region variance value, the reflection amount indicating a degree to which a filter output value obtained by the filtering process applied by the filter processing means contributes to generation of a pixel value of a pixel of the output image corresponding to the pixel of interest; and
    combining means for calculating the pixel value of the pixel of the output image corresponding to the pixel of interest, the calculation being based on each of filter output values obtained by filtering processes applied by a plurality of filter processing means, each of reflection amounts determined with respect to the filter output values, and the pixel value of the pixel of interest.

2. The signal processing apparatus according to claim 1, wherein the combining means calculates the pixel value of the pixel of the output image by multiplying differences between the pixel value of the pixel of interest and the filter output values by the reflection amounts to determine difference values and adding a sum of the difference values to the pixel value of the pixel of interest.

3. The signal processing apparatus according to claim 1, wherein the reflection amount determining means determines the reflection amount of the filter output value from the region variance value calculated by the region variance value calculating means using information indicating a value of a reflection amount with respect to a magnitude of a region variance value, the information being determined in advance for each of the filters used in the filtering process.

4. The signal processing apparatus according to claim 1, wherein the plurality of filter processing means include first filter processing means configured to perform the filtering process using a filter that performs a moving average process, and
    wherein the plurality of filter processing means further include second filter processing means configured to perform the filtering process using a filter that performs a smoothing process.

5. A signal processing method for performing a filtering process on an input image using a plurality of filters to generate an output image, the signal processing method comprising the steps of:
    calculating a region variance value for a region around a predetermined pixel used as a pixel of interest on the input image, the region variance value indicating a degree of variations of pixel values of pixels located in the region with respect to an average of pixel values of the pixels located in the region;
    applying, at filter processing means, a filtering process to a pixel value of the pixel of interest using the filters;
    determining a reflection amount based on the region variance value, the reflection amount indicating a degree to which a filter output value obtained by the filtering process applied by the filter processing means contributes to generation of a pixel value of a pixel of the output image corresponding to the pixel of interest; and
    calculating the pixel value of the pixel of the output image corresponding to the pixel of interest, the calculation being based on each of filter output values obtained by filtering processes applied by a plurality of filter processing means, each of reflection amounts determined with respect to the filter output values, and the pixel value of the pixel of interest.

6. A signal processing program for performing a filtering process on an input image using a plurality of filters to generate an output image, the program causing a computer to execute a process comprising the steps of:
    calculating a region variance value for a region around a predetermined pixel used as a pixel of interest on the input image, the region variance value indicating a degree of variations of pixel values of pixels located in the region with respect to an average of pixel values of the pixels located in the region;
    applying, at filter processing means, a filtering process to a pixel value of the pixel of interest using the filters;
    determining a reflection amount based on the region variance value, the reflection amount indicating a degree to which a filter output value obtained by the filtering process applied by the filter processing means contributes to generation of a pixel value of a pixel of the output image corresponding to the pixel of interest; and
    calculating the pixel value of the pixel of the output image corresponding to the pixel of interest, the calculation being based on each of filter output values obtained by filtering processes applied by a plurality of filter processing means, each of reflection amounts determined with respect to the filter output values, and the pixel value of the pixel of interest.

7. A signal processing apparatus for performing a filtering process on an input image using a plurality of filters to generate an output image, the signal processing apparatus comprising:

a region variance value calculating unit configured to calculate a region variance value for a region around a predetermined pixel used as a pixel of interest on the input image, the region variance value indicating a degree of variations of pixel values of pixels located in the region with respect to an average of pixel values of the pixels located in the region;

a filter processing unit configured to apply a filtering process to a pixel value of the pixel of interest using the filters;

a reflection amount determining unit configured to determine a reflection amount based on the region variance value, the reflection amount indicating a degree to which a filter output value obtained by the filtering process applied by the filter processing unit contributes to generation of a pixel value of a pixel of the output image corresponding to the pixel of interest; and a combining unit configured to calculate the pixel value of the pixel of the output image corresponding to the pixel of interest, the calculation being based on each of filter output values obtained by filtering processes applied by a plurality of filter processing units, each of reflection amounts determined with respect to the filter output values, and the pixel value of the pixel of interest.

* * * * *